United States Patent
Kuroda et al.

(10) Patent No.: US 6,487,150 B2
(45) Date of Patent: Nov. 26, 2002

(54) CLOCK SIGNAL GENERATING SYSTEM

(75) Inventors: Kazuo Kuroda, Saitama-ken (JP); Toshio Suzuki, Saitama-ken (JP); Masayoshi Yoshida, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 10/117,184

(22) Filed: Apr. 8, 2002

(65) Prior Publication Data

US 2002/0110060 A1 Aug. 15, 2002

Related U.S. Application Data

(63) Continuation of application No. 09/981,984, filed on Oct. 19, 2001, now Pat. No. 6,385,151, which is a division of application No. 09/588,531, filed on Jun. 7, 2000, now Pat. No. 6,310,843, which is a continuation of application No. 09/026,547, filed on Feb. 20, 1998, now Pat. No. 6,081,490.

(30) Foreign Application Priority Data

Feb. 21, 1997 (JP) ............................................. 9-054161
Feb. 5, 1998 (JP) .......................................... 10-039657

(51) Int. Cl.$^7$ ................................................ G11B 5/09
(52) U.S. Cl. .............................. 369/47.28; 369/47.38; 369/47.5
(58) Field of Search ........................... 369/47.28, 47.38, 369/47.47, 47.48, 47.5, 47.51, 59.12, 59.23, 59.25, 124.07, 124.14, 116

(56) References Cited

U.S. PATENT DOCUMENTS

| | | | | |
|---|---|---|---|---|
| 5,523,987 A | * | 6/1996 | Muto | 369/124.14 |
| 5,835,461 A | | 11/1998 | Kobayashi et al. | 369/48 |
| 5,852,599 A | | 12/1998 | Fuji | 369/275.4 |
| 5,920,526 A | * | 7/1999 | Udagawa | 369/44.28 |
| 5,930,228 A | | 7/1999 | Miyamoto et al. | 369/275.4 |
| 6,069,870 A | | 5/2000 | Maeda et al. | 369/275.4 |
| 6,192,018 B1 | * | 2/2001 | Kobayashi et al. | 369/59.25 |

* cited by examiner

Primary Examiner—Thang V. Tran
(74) Attorney, Agent, or Firm—Arent Fox Kintner Plotkin & Kahn, PLLC

(57) ABSTRACT

A clock signal generating system of the present invention is provided for recording information on a disc. The disc has a plurality of recording tracks wobbled by a wobble signal having a predetermined frequency and a plurality of prepits disposed at positions having a predetermined phase relation with respect to a phase of the wobble signal. A clock signal is generated based on the wobble signal. A prepit signal is produced from the prepit. The phase of the wobble signal is compared with a phase of the prepit signal, thereby generating a phase adjusting signal. The phase of the clock signal is adjusted based on the phase adjusting signal. A recording clock signal for recording the information is produced by an adjusted clock signal.

11 Claims, 11 Drawing Sheets

CLOCK SIGNAL GENERATING SYSTEM

This is a Continuation of application Ser. No. 09/981,984, filed Oct. 19, 2001 now U.S. Pat. No. 6,385,151 which in turn is a Divisional of application Ser. No. 09/588,531, filed Jun. 7, 2000, now U.S. Pat. No. 6,310,843 which in turn is a continuation of Parent Application No. 09/026,547, filed Feb. 20, 1998 now U.S. Pat. No. 6,081,490. The disclosure of the prior applications is hereby incorporated by reference herein in its entirety.

BACKGROUND OF THE INVENTION

The present invention relates to a system for generating a clock signal used when recording data on an optical disc, and more particularly to a generating system wherein the clock signal is extracted from wobble signal which is generated when a wobbled recording groove tracks formed on the disc is read out.

There has been known a Compact Disc-Recordable (CD-R) disc which is a write-once optical disc. The CD-R disc has a plurality of recording groove tracks in which data are recorded. The groove tracks are slightly wobbled in the radial direction of the disc by a wobble signal which is modulated with a frequency modulation. Therefore, when the CD-R disc is rotated, there is generated the wobble signal having a predetermined frequency (22.05 KHz). The carrier wave carries prerecorded information such as position information of the tracks.

In order to generate the wobble signal, a light beam is radiated on the groove tracks. The reflected beam is applied to a photodetector divided into two portions by a line optically parallel with a tangent of the groove tracks. A difference signal dependent on the difference between the outputs of the two portions is then applied to a band pass filter (BPF) having a transmitting range, the intermediate frequency of which corresponds to the predetermined frequency, that is 22.05 KHz. The rotation of the disc is controlled so that the average frequency of the extracted wobble signal becomes 22.05 KHz.

The extracted wobble signal is further used as a reference signal for producing a clock signal used at the recording. Namely, the wobble signal is a continuous signal having a frequency component which is synchronous with the rotation of the disc. When the phase of the clock signal is synchronous with that of the continuous signal, the clock signal accurately synchronizes with the rotation of the disc.

Meanwhile, the research and development of a write-once Digital Versatile Disc-Recordable (DVD-R) are much in progress. The recording capacity of the DVD disc is increased about 7 times as much as that of the CD-R disc. In order to increase the recording density, the distance between tracks of the DVD-R disc is decreased to substantially half of that of the CD-R disc. As a result, a part of the light beam applied on one groove track radiates the adjacent groove track, thereby causing a so-called crosstalk which cannot be ignored. When there occurs the crosstalk caused by the adjacent right and left groove tracks, the extracted wobble signal is interfered by the wobble component of the adjacent groove tracks so that the amplitude and the phase thereof deviate. In particular, when the phase is deviated, jitters inevitably occur, so that a clock signal which is accurately synchronous with the rotation of the disc cannot be generated.

More particularly, the crosstalk causes a deviation in a disc rotation control signal because of a phase difference between the reference clock signal and the extracted wobble signal. Accordingly, there occurs a difference in the period of time necessary for the rotation controlling operation dependent on the deviated rotation control signal to be effected, and a period of time it takes a phase-locked loop to generate the clock signal. Due to the inertia of the disc, it usually takes much longer time for the rotation control system to respond than the phase-locked loop. As a result, the phase of the clock signal is deviated from the phase of the rotation of the disc. Such a deviation causes the recording pits to be inaccurately formed in the groove track at recording as regards to the length thereof. Therefore, error occurs at reproduction of the disc.

SUMMARY OF THE INVENTION

An object of the present invention is to provide a clock signal generating system wherein the generated clock signal used at the recording of information is accurately synchronized with the rotation of the disc even if there occurs a crosstalk between adjacent groove tracks.

According to the present invention, there is provided a clock signal generating system for recording information on a disc which has a plurality of recording tracks wobbled by a wobble signal having a predetermined frequency and a plurality of prepits disposed at positions having a predetermined phase relation with respect to a phase of the wobble signal.

The system comprises generator means for generating a clock signal, extractor means for extracting the wobble signal, detector means for detecting the prepit and for producing a prepit signal, phase adjusting signal generator means for comparing the phase of the wobble signal with a phase of the prepit signal and for generating a phase adjusting signal, adjusting means for adjusting a phase of the clock signal based on the phase adjusting signal, and recording clock signal generator for generating a recording clock signal by an adjusted clock signal adjusted by the adjusting means.

The adjusting means comprises a phase shifter for shifting the phase of the clock signal.

The generator means comprises a PLL circuit for generating a clock signal in synchronism with the phase of the wobble signal.

In another aspect of the present invention, the generator means comprises a phase comparator for producing a phase difference signal representing a phase difference between the clock signal and the wobble signal and a PLL circuit having an oscillator for generating a clock signal based on the phase difference signal, the adjusting means comprises an adder disposed between phase difference comparing means and the oscillator in the PLL circuit, for adding the phase difference signal and the phase adjusting signal.

In a further aspect, the generator means comprises first phase comparator means for comparing a phase of the clock signal with a phase of reference clock signal and for producing a first phase difference signal, and a PLL circuit having an oscillator for generating the clock signal based on the first phase difference signal, the adjusting means comprises a phase shifter for shifting the phase of an extracted wobble signal, second phase comparator means for comparing a phase of the extracted wobble signal with a phase of the reference clock signal and for producing a second phase difference signal, and an adder disposed between the first phase comparator means and the oscillator in the PLL circuit, for adding the first phase difference signal and the second phase difference signal.

The generator means may have a voltage controlled oscillator for changing a frequency of the clock signal in accordance with a control voltage signal, the adjusting means may have a phase shifter for shifting a phase of an extracted wobble signal in accordance with the phase difference signal, control voltage generator means for generating the control voltage signal based on a phase difference between an output signal from the phase shifter and the clock signal.

In a further aspect, the generator means comprises a frequency divider for dividing a frequency of the clock signal and for generating a wobble signal frequency signal, first phase comparator means for comparing a phase of the wobble signal frequency signal with a phase of an extracted wobble signal and for producing a first phase difference signal, and a PLL circuit having an oscillator for generating the clock signal based on the first phase difference signal, the adjusting means comprises a phase shifter for shifting a phase of a wobble signal from the frequency divider in accordance with the phase adjusting signal, and a second PLL for producing a recording clock signal in synchronism with a phase of the wobble signal frequency signal.

These and other objects and features of the present invention will become more apparent from the following detailed description with reference to the accompanying drawings.

DETAILED DESCRIPTION OF THE PREFERRED EMBODIMENTS

Figure 1:
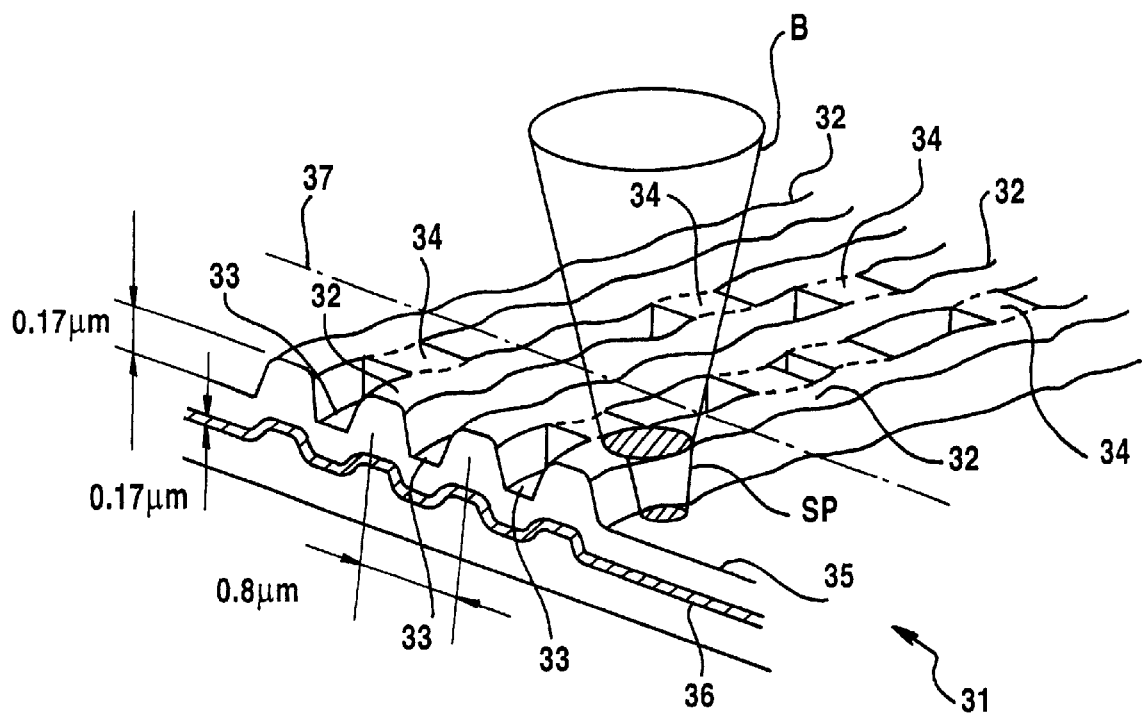
FIG. 1 is a perspective view showing a part of a DVD-R disc for which a clock signal generating system of the present invention is used.

Referring to FIG. 1, a DVD-R disc 31 is provided with a pigment film 35 having a gold backing 36 formed by vapor deposition so as to reflect a light beam B such as a laser beam. A plurality of groove tracks 32 for recording information are formed on the pigment film 35. A land track 33 for guiding the light beam B at recording and reproduction is provided between the groove tracks 32. When manufacturing the disc, each groove track 32 is wobbled at a frequency corresponding to the rotational speed of the disc.

Prepits 34 are formed on each land track 33 at a predetermined interval so that prerecorded information such as the position information of the track is recorded beforehand. The prepits 34 are formed when the disc 31 is manufactured. A protection film 37 is formed on the pigment film 35 to protect the tracks 32 and 33.

When recording information such as image information on the disc 31, a data recording and reproducing system which will be later described in detail, reads out a wobbling frequency from the groove track 32. The rotational speed of the disc 31 is controlled so that the read out wobbling frequency coincides with a predetermined reference frequency. Moreover, the optimum power for recording information is determined dependent on the prerecorded information read out from the prepit 34. At the same time, address information indicating the position of the track on the disc 31 is also read out from the prepit 34 and the recording information data are recorded at the corresponding position based on the read out address.

At the recording, the light beam B is adapted to be focused in the groove track 32 so that the center of the beam coincides with the center of the track 32. Thus a recording information pit corresponding to the recording information data is formed in the groove track 32, thereby recording the data. The size of a beam spot SP which is formed by the beam B is determined so that the beam radiates not only the groove track 32 but also the adjacent land tracks 33 as shown by a hatched area in FIG. 1.

The light reflected from the land groove 33 is applied to a photodetector (not shown), having a detecting area divided into two by a division line disposed in parallel to the tangential direction of the track 32, that is, the rotating direction of the disc 31. The data recording and reproducing system uses the radial push-pull method to reproduce the prerecorded information from the prepits 34. Furthermore, a wobble signal is reproduced from the groove tracks 32 in order to generate a clock signal synchronous with the rotation of the disc 31.

Figure 2:
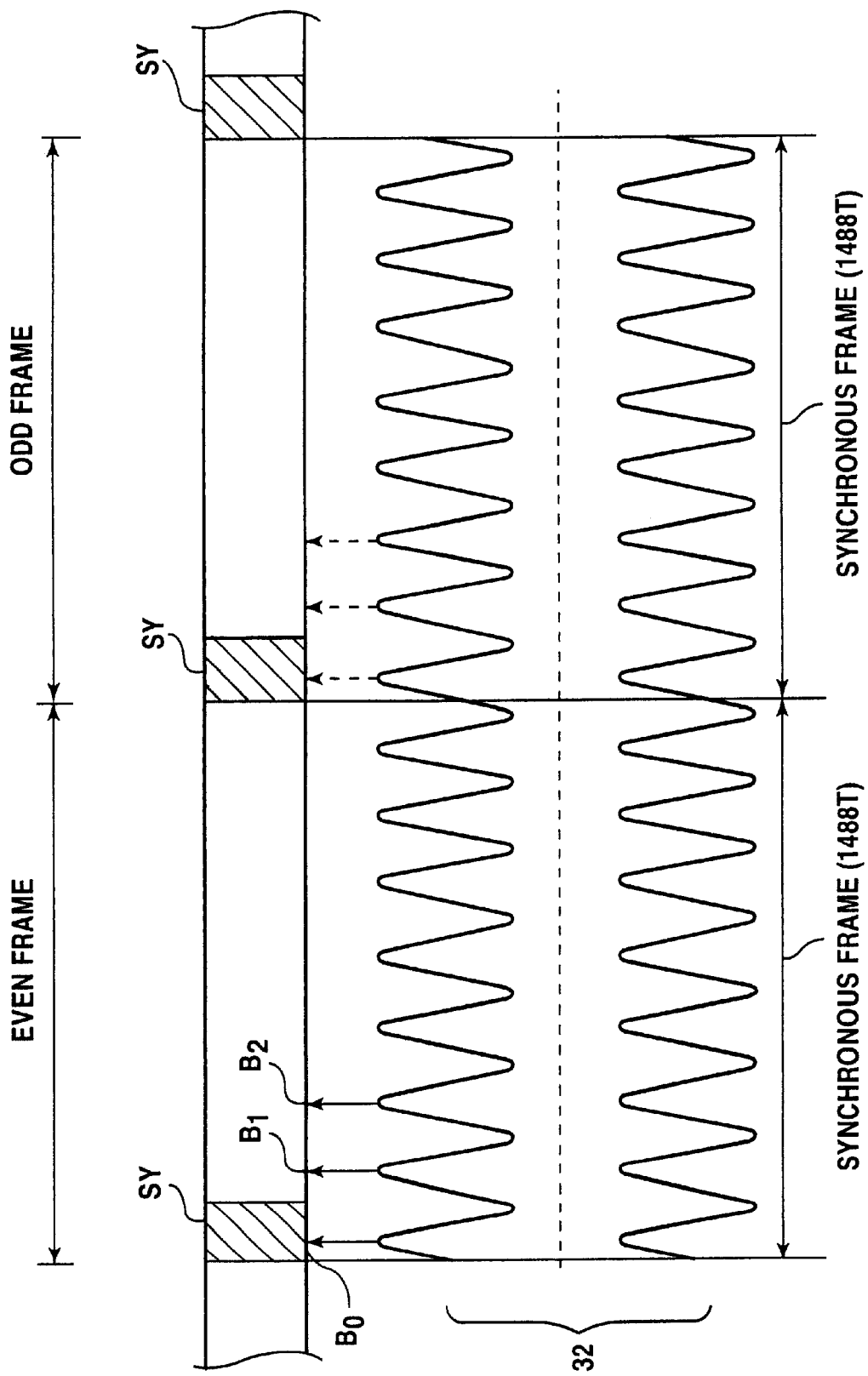
FIG. 2 is a diagram showing an example of a recording format of the DVD-R disc of FIG. 1.

FIG. 2 explains the recording format of the groove track 32. The upper portion of the diagram shows the recording format and the lower portion shows the wobbling state of the groove track 32 shown as a plan view thereof. The arrows pointing upward drawn between the upper and lower portions exemplarily show the positions where the prepits 34 are formed on the land tracks 33. The wave showing the wobbling of the groove track 32 are shown with a larger amplitude than the actual amplitude for the ease of understanding. The information data are recorded on the center line of the groove tracks 32.

Referring to FIG. 2, the recording information data to be recorded on the disc 31 are divided in accordance with synchronous frames. Twenty-six synchronous frames compose one recording sector, and sixteen recording sectors compose one error correcting code block. One synchronous frame has a length of 1488T wherein T is a unit length which corresponds to an interval of the pits determined in accordance with the recording format. Synchronizing data SY for synchronizing each synchronous frame is prerecorded at the starting portion of the synchronous frame having a length 14T.

Each synchronous frame is provided with the prerecorded information recorded on the disc 31. If the prerecorded information is to be recorded in the prepit 34, at least one prepit 34 is essentially formed on the land track 33 adjacent the area wherein the synchronizing information SY of a particular synchronous frame is recorded in the groove track 32. In addition, there may be formed additional prepits 34 for recording information indicating the contents of other prerecorded information besides the synchronizing information SY which is recorded in the front half portion of the synchronous frame.

The prepit 34 may be completely omitted for some synchronous frames, depending on the contents of the prerecorded information. Namely, in one recording sector, only the even-numbered synchronous frames, hereinafter called even frames, are provided with the prepits 34 in the adjacent land grooves 33 as shown by solid arrows $B_0$, $B_1$, and $B_2$ in FIG. 2. However, the prepits 34 are not formed for the next synchronous frame, which is an odd-numbered frame, hereinafter called an odd frame. The formation of the prepits 34 for the even frame and the odd frame depends on whether the even frame is the first frame of a recording sector, and on the contents of the information to be recorded in the synchronous frames.

More particularly, in the case where prepits 34 are formed for the even frames, three prepits 34, namely prepits $B_0$, $B_1$, and $B_2$ are formed on the land track 32 adjacent the first synchronous frame of each recording sector. For the other synchronous frames, if the prerecorded information of the resepective frames is "1", only the prepits $B_0$ and $B_2$ are formed, and if the prerecorded information is "0", prepits $B_0$ and $B_1$ are formed. On the other hand, when the prepits 34 are formed for the odd frames, prepits $B_0$ and $B_1$ are formed for the odd frame at the start of each recording section. For the other synchronous frames, the prepits are formed in the same manner as for the even frames.

Whether to form the prepits 34 to correspond to the even frames or the odd frames further depends on the position of the prepits 34 on the adjacent land groove 33. Namely, prepits 34 are generally provided on the land groove 33 to correspond to the even frames. However, if there are already formed prepits 34 on the inner land track 33 radially adjacent the prepit 34 of the even frame, there occurs a crosstalk when reading out the prepits 34. Hence in order to prevent the influence of the crosstalk, prepit 34 is formed to correspond to the next synchronous frame, which is an odd frame.

The groove tracks 32 are wobbled across all of the synchronous frames at a wobbling frequency f0 of 140 KHz. As shown in FIG. 2, eight peaks are generated in one synchronous frame. The data recording and reproducing system derives the wobbling frequency f0 to generate a signal for controlling the rotation of a spindle motor for driving the disc 31. Moreover, a clock signal for recording is also generated.

In order to maintain the relationship between the phases of the prepits 34 and the wobble signal constant, the first prepit $B_0$ of each synchronous frame is formed at a predetermined distance from the starting position of the synchronous frame, for example, 7T, and the prepits $B_1$ and $B_2$ are formed sequentially at an interval of 186T (1488T/8), respectively. The method for forming the prepits is described in detail in Japanese Patent Application No. 8-310941.

Figure 3:
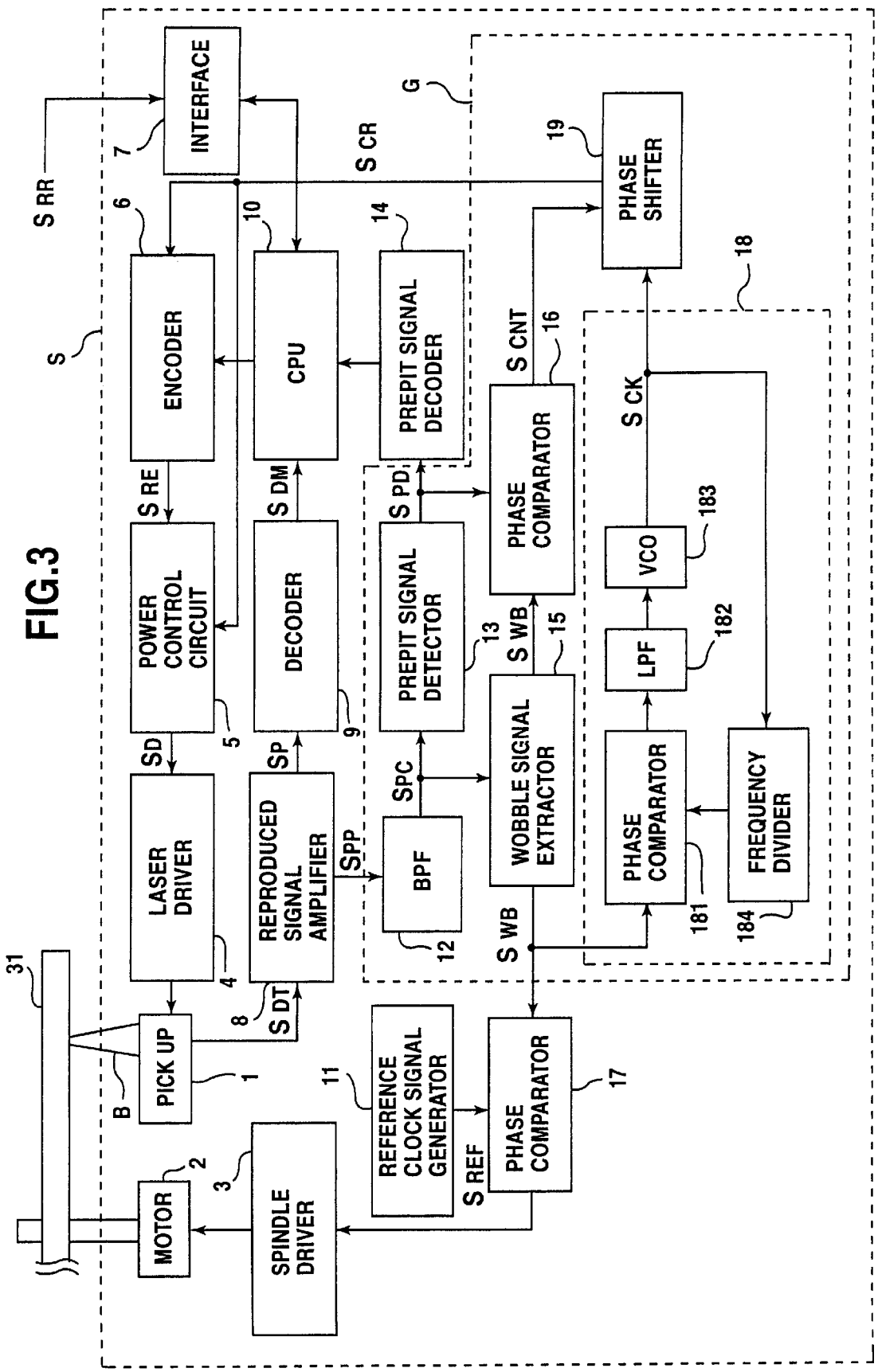
FIG. 3 is a block diagram of a data recording and reproducing system for the DVD-R disc having the clock signal generating system of the present invention.

FIG. 3 shows a data recording and reproducing system S for recording on the DVD-R disc 31 digital information data transmitted from an external host computer (not shown). The prepits 34 storing such information as the address information and the wobbling groove tracks 32 are formed beforehand on the disc 31. When recording digital information data, predetermined prepits 34 are read out to obtain the address information so that the data information is recorded at an appropriate position on the disc 31.

Digital information data SRR to be recorded on the disc 31 is applied from the external host computer to a CPU 10 through an interface 7. The CPU 10 controls the recording and reproducing operations of the data recording and reproducing system S. The digital information data SRR is further applied to an encoder 6 to which a clock signal SCR as a timing signal for recording data is applied from a phase shifter 19 of a clock signal generating circuit G. The operation of the phase shifter 19 will be described later in detail. An error checking and correction (ECC), eight to sixteen modulation and scrambling are executed at the encoder 6 in accordance with the clock signal SCR, thereby producing a modulated signal SRE which is fed to a laser power control circuit 5.

The power control circuit 5 shapes the waveform of the modulated signal SRE into a preferable shape based on the clock signal SCR, thereby producing a recording signal SD for forming recording pits of appropriate shape on the disc 31. Hence the so-called write strategy is carried out. The recording signal SD is applied to a laser driver 4 which applies a laser driving signal correponding to the recording signal SD.

The optical pickup 1 comprises a laser diode, polarizing beam splitter, objective and a photodetector. When recording information data, the laser diode driven by the laser driving signal emits the laser beam B at a power corresponding to the recording signal SD, so that information pits are formed on the disc 31.

When reading out the digital information data from the disc 31, the light beam B of a constant power is applied to the disc 31. The light beam B is reflected from the disc 31 and applied to the photodetector of the pickup 1 which converts the light into an electrical signal. After a calculation such as that in accordance with the radial push-pull method, there is produced a detected signal SDT including the read out prerecorded information from the prepit 34, wobble signal extracted from the groove track 32, and the digital information data recorded in the groove track 32. The detected signal SDT is fed to a reproduced signal amplifier 8.

The reproduced signal amplifier 8 amplifies the detected signal SDT and applies an amplified information data signal SP representing the recorded digital information data to a decoder 9. The decoder 9 carries out the eight to sixteen demodulation and further de-interleaves the amplified data signal SP to produce a demodulated data signal SDM which is applied to the CPU Adz 10. The CPU 10 derives the digital information data from the demodulated signal SDM and transmits the data to the host computer.

During the recording operation, the reproduced signal amplifier 8 further generates a prerecorded information signal SPP which represents the prerecorded information data in the prepit 34 and the wobble signal. The prerecorded information signal SPP is applied to a band pass filter (BPF) 12 of the clock signal generator G. The clock signal generator G generates clock signals used at recording data and for controlling the rotation of the disc 31.

Figure 5:
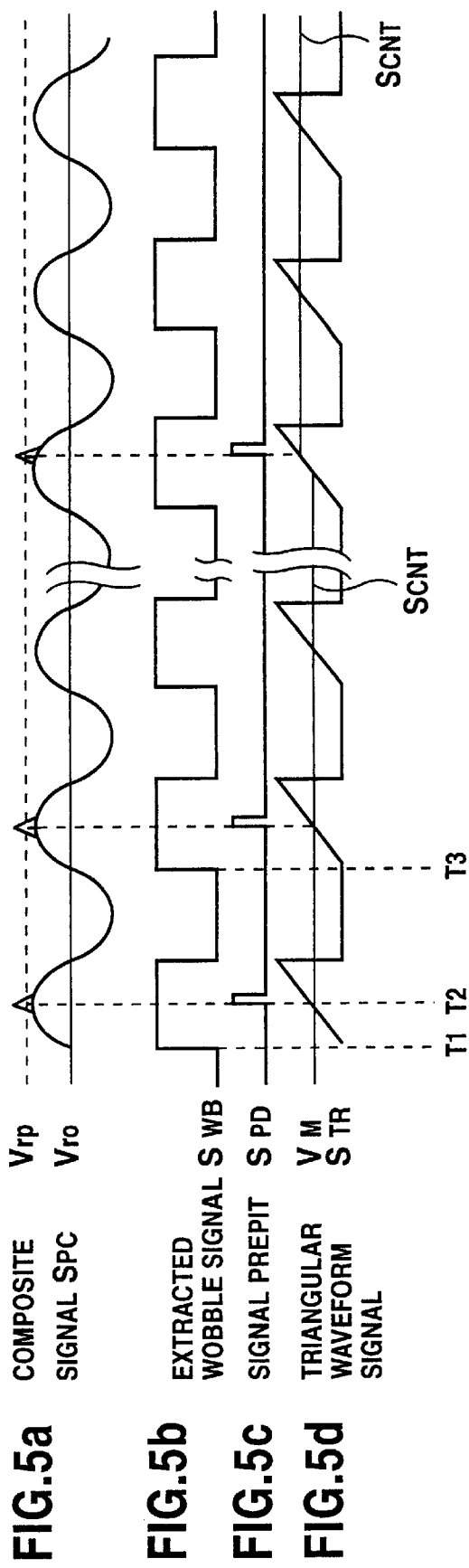
FIGS. 5a to 5d are graphs showing a composite signal, extracted wobble signal, prepit detection signal, and a triangular waveform signal, respectively.

The BPF 12 removes noise components included in the prerecorded information signal SPP and further derives a composite signal SPC shown in FIG. 5a comprising the wobble signal and the prerecorded information reproduced from the prepit 34 at a predetermined position such as at the maximum amplitude of the wobble signal. The composite signal SPC is fed to a prepit signal detector 13 and to a wobble signal extractor 15.

The prepit signal detector 13 comprises a comparator which compares the level of the amplitude of the composite signal SPC with a predetermined reference value Vrp which is larger than the maximum amplitude of the wobble signal as shown in FIG. 5a. When the amplitude of the composite. signal SPC exceeds the reference value Vrp, it means that the prepit 34 is formed in the land track 33 at a position adjacent the groove track 32 which is being read out. While the amplitude of the composite signal SPC thus exceeds the reference value Vrp, the prepit signal detector 13 produces a prepit detection signal SPD in the form of pulse signal as shown in FIG. 5c. The prepit detection signal SPD is fed to a phase comparator 16 and a prepit signal decoder 14.

The prepit signal decoder 14 decodes the prepit detection signal SPD to reproduce the prerecorded information stored in the prepit 34 including address information of the disc 31. The prerecorded information is applied to the CPU 10 which derives the address information therefrom, so that the digital information data is recorded at an appropriate address on the disc 31 at recording.

The wobble signal extractor 15 of the clock signal generator G to which the composite signal SPC is applied, comprises a comparator which compares the amplitude of the composite signal SPC with a predetermined reference value Vr0, for example, the intermediate value of the positive and negative peak values of the composite signal, as shown in FIG. 5a. The wobble signal extractor 15 generates an extracted wobble signal SWB in the form of a pulse signal, high level pulse widths of which corresponds to periods wherein the amplitude of the composite signal SPC is larger than the reference value Vr0 as shown in FIG. 5b. The extracted wobble signal SWB is fed to phase comparators 16 and 17 and to a phase-locked loop (PLL) 18.

The phase comparator 17 is applied with a reference clock signal SREF from a reference clock signal generator 11 which represents a reference frequency component of a rotational speed of the disc 31. The comparator 17 compares the phases of the reference clock signal SREF and the extracted wobble signal SWB to obtain the difference therebetween. The difference signal is applied to a spindle servo system as a motor control signal. The spindle servo system comprises a spindle motor 2 which rotates the disc 31, and a spindle driver 3 for controlling the motor 2. Hence the disc 31 is rotated at a rotational speed based on the frequency of the clock signal from the reference clock signal generator 11 at the correct phase.

The PLL 18 comprises a phase comparator 181 to which the extracted wobble signal SWB is applied, low-pass filter (LPF) 182, voltage controlled oscillator (VCO) 183, and a frequency divider 184, and generates a clock signal SCK synchronized with the phase of the extracted wobble signal SWB. The clock signal SCK is applied to the phase shifter 19.

The phase comparator 16 and the phase shifter 19 will be described in detail with reference to FIG. 4.

Figure 4:
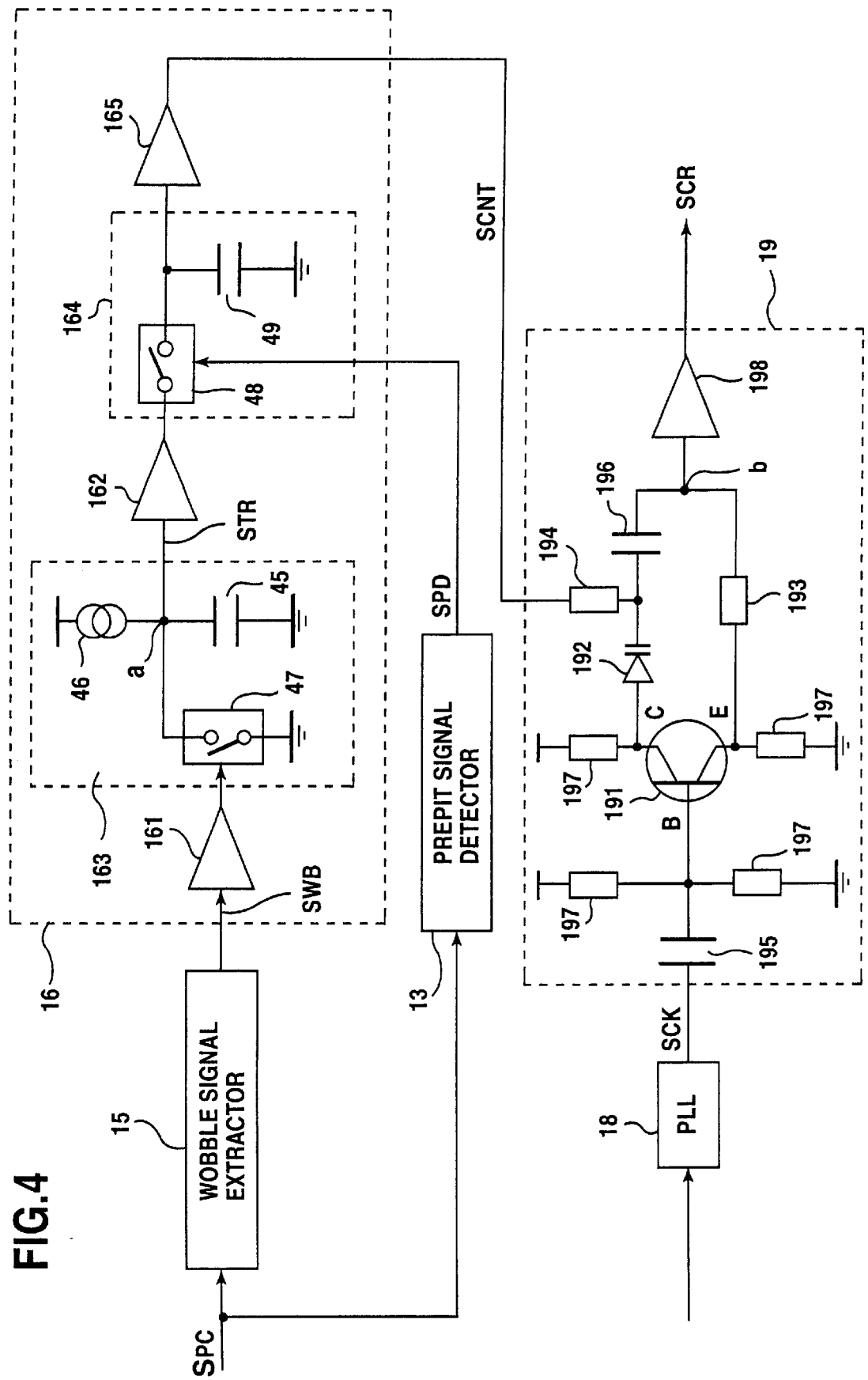
FIG. 4 is a block diagram showing a phase comparator and a phase shifter provided in the clock generating system of FIG. 3.

Referring to FIG. 4, the extracted wobble signal SWB from the wobble signal extractor 15 is applied to a triangular waveform generator 163 through a buffer 161. The triangular waveform generator 163 comprises a capacitor 45, one terminal of which is grounded. The other terminal of the capacitor 45 is connected to a constant current source 46 through a junction a. A switch 47, to which the extracted wobble signal SWB is applied, is connected to the junction a. Namely, when the level of the extracted wobble signal SWB is at a high level, the switch is opened, thereby applying a constant charging current to the capacitor 45. As a result, a terminal voltage at the junction a, that is the charged voltage in the capacitor 45, starts to increase at a time T1 shown in FIG. 5d at an increment dependent on the electrostatic capacity of the capacitor 45.

When the level of the extracted wobble signal SWB becomes a low level at a time T2, the switch 47 is closed, thereby instantaneously discharging the voltage charged in the capacitor 45. Accordingly, the junction a becomes the ground voltage. Thus, a triangular waveform signal STR having an inclination of a predetermined angle is generated. Upon the closing of the switch 47, the charging current from the constant current source 46 bypasses the capacitor 45. When the level of the extracted wobble signal SWB again becomes high at a time T3, the switch 47 is opened, thereby charging the capacitor 45. Hence the terminal voltage of the capacitor 45 is gradually increased from the ground voltage at a predetermined rate. Thus, the triangular waveform generator 163 produces the triangular waveform signal STR, the amplitude of which varies at a predetermined rate while the level of the extracted wobble signal SWB is high.

The triangular waveform signal STR is applied to a sample-and-hold circuit 164 through a buffer 162. The sample-and-hold circuit 164 comprises a switch 48 connected to the buffer 162 and to which the prepit detection signal SPD from the prepit signal detector 13 is applied, and a capacitor 49 connected to the switch 48. When the level of the prepit detection signal SPD is high, the switch 48 is closed, thereby applying the triangular waveform signal STR to the capacitor 49 to charge the capacitor 49. To the contrary, when the level of the prepit detection signal SPD becomes low, the switch 48 is opened to stop the charge. Hence the charged voltage is maintained at a level corresponding to the amplitude level of the triangular waveform signal STR at the time of the closing of the switch 48 until the prepit detection signal SPD again becomes high to close the switch 48 again. The sample-and-hold circuit 164 produces a phase adjusting signal SCNT in accordance with the voltage held therein.

More specifically, if the phases of the extracted wobble signal SWB and the prepit detection signal SPD coincide with each other, the phase adjusting signal SCNT sampled at the timing of the prepit detection signal SPD is constant at an intermediate value VM between the minimum and maximum amplitude levels of the triangular waveform signal STR as shown in FIG. 5d. However, when the phase of the prepit detection signal SPD differs from that of the extracted wobble signal SWB, the level of the phase adjusting signal SNCT deviates from the intermediate value VM, for example, as shown in the latter portion of the graph in FIG. 5d.

More particularly, when there is a crosstalk between the adjacent groove tracks 32, the wobble signal component of the adjacent groove track is included in the wobble signal. Due to the interference by the wobble signal component, the extracted wobble signal SWB is deflected with respect to the time axis. On the other hand, as hereinbefore described, since the prepits 34 are never formed at the adjacent positions in the radial direction of the disc 31 which are near enough to cause crosstalk, the prepit detection signal SPD derived from the composite signal SPC is always at an accurate timing without any deflection with respect to the time axis.

By thus sampling the triangular waveform signal STR at the timing corresponding to the prepit detection signal SPD, a deflection of the phases can be detected. Namely, the phase comparator 16 generates a voltage signal which changes in a range between the amplitudes of the triangular waveform signal STR centering the intermediate value VM. The voltage signal, that is the phase adjusting signal SCNT, corresponds to a difference between the phase of the prepit detection signal SPD and the phase of the extracted wobble signal SWB, which becomes erroneous in time axis when there is a crosstalk. In other words, the phase adjusting signal SCNT represents the deviation of the phase of the wobble signal.

The phase adjusting signal SCNT is fed to the phase shifter 19 through a buffer 165. The phase shifter 19 has a capacitor 195 connected to the PLL 18 and a transistor 191, the base B of which is connected to the capacitor 195. The collector C of the transistor 191 is connected to an anode of a variable capacitance diode 192. The cathode of the variable capacitance diode 192 is applied with the phase adjusting signal SCNT from the phase comparator 16 through a resistor 194 and further connected to a junction b through a capacitor 196. The junction b is connected to the emitter E of the transistor 191 through a resistor 193. The junction b is further connected to a buffer 198. A plurality of resistors 197 are disposed as bias resistors for the transistor 191.

In operation, the clock signal SCK applied to the phase shifter 19 is adjusted of the phase thereof in accordance with the level of the phase adjusting signal SNCT as described hereinafter. The clock signal SCK applied to the base B of the transistor 191 produces an output at the collector C at a phase inverted 180 degrees from the clock signal, and an output at the emitter E at the same phase. If a reactance based on the electrostatic capacitance of the variable capacitance diode 192 and the capacitor 196 is sufficiently smaller than the resistance of the resistor 193, the phase shifter 19 generates an adjusted clock signal SCR having a phase inverted substantially 180 degrees from that of the input clock signal SCK. If the reactance dependent on the electrostatic capacitance of the variable capacitance diode 192 and the capacitor 196 is sufficiently larger than the resistance of the resistor 193, the adjusted clock signal SCR having the same phase as that of the input clock signal SCK is generated.

More particularly, the phase adjusting signal SCNT is fed to the variable capacitance diode 192 so that the terminal voltage, and hence the reactance thereof is changed in accordance with the level of the signal SNCT. Namely, the reactance of the variable capacitance diode 192 is controlled in accordance with the deviation of the phase adjusting signal SNCT from the intermediate value VM, and the phase of the clock signal SCK is shifted in the direction canceling the deviation. The phase of the clock signal SCK is adjusted so as to cancel the deviation. The thus adjusted clock signal SCR is fed to the encoder 6 and the power control circuit 5 so as to be used as the clock signal at the recording of information.

Hence, in accordance with the present invention, the deviation in the phase with regard to the time axis of the clock signal generated from the wobble signal which is under the influence of crosstalk, can be corrected so as to comply with the timing of the prepit detection signal. Accordingly, an adjusted clock signal which is synchronous with the rotation of the disc at a high accuracy is generated.

Figure 6:
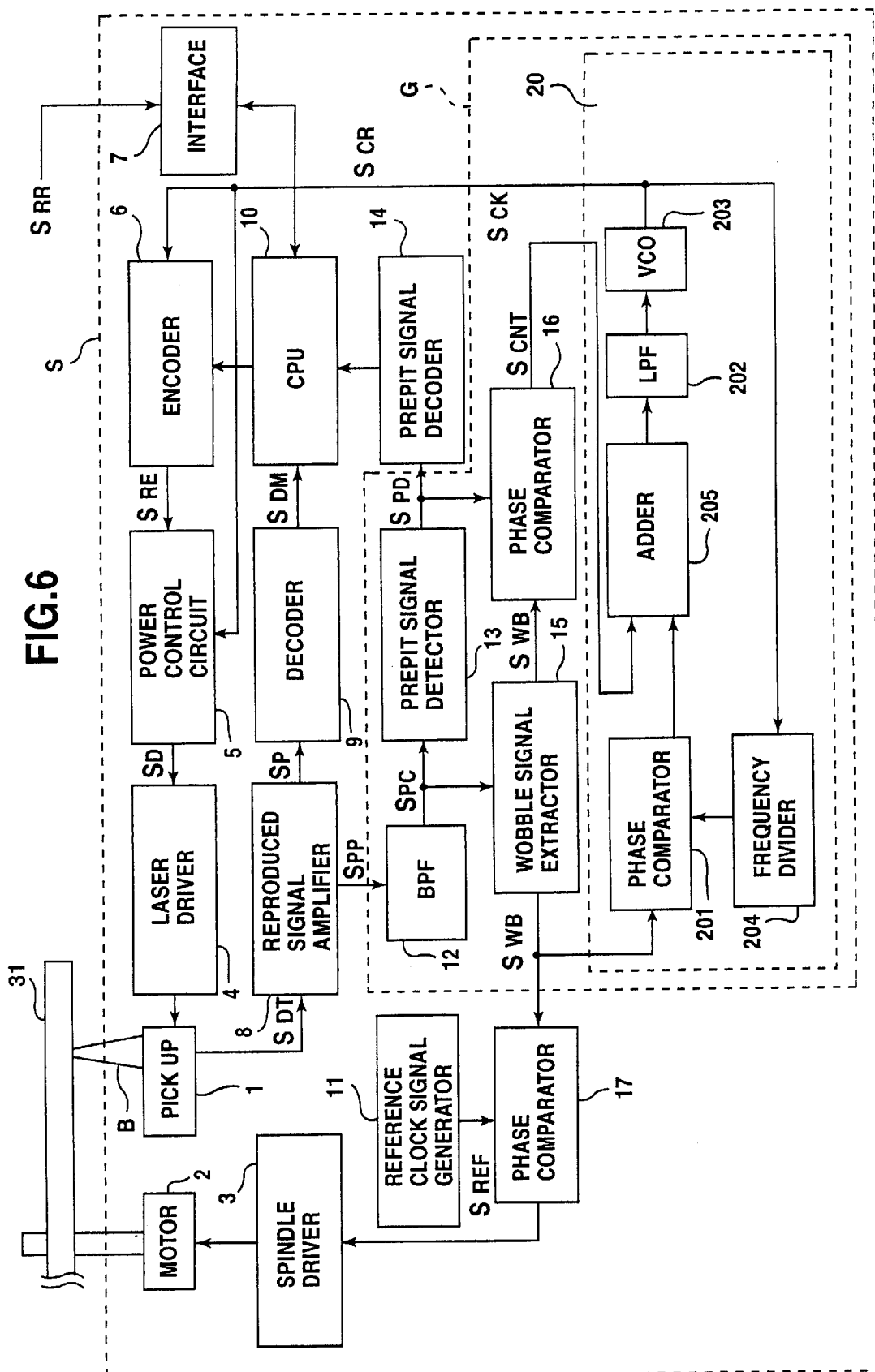
FIGS. 6 to 11 are block diagrams showing various embodiments of the clock signal generating system.

Referring to FIG. 6, the second embodiment of the present invention is provided with a PLL 20 instead of the PLL 18, and the phase shifter 19 is obviated. The PLL 20 comprises a voltage controlled oscillator (VCO) 203 which generates a clock signal SCK. The clock signal SCK is applied to a frequency divider 204 which divides the clock signal SCK and renders the frequency thereof at the same frequency as that of the wobble signal. The divided signal is fed to a comparator 201 to which is applied the extracted wobble signal SWB, thereby comparing the phases thereof. Accordingly, a phase difference signal is generated which is applied to an adder 205. The adder 205 is further applied with the phase adjusting signal SNCT from the phase comparator 16 so that the signals are added. The components of the added signal in a lower range is extracted by an LPF 202 and applied to the VCO 203 as a control voltage. Thus, the adjusted clock signal SCK is applied to the encoder 6 and the power control circuit 5.

When there is a crosstalk, the extracted wobble signal SWB is deflected with respect to the time axis. The deflection is canceled in accordance with the voltage of the phase adjusting signal SCNT so that the adjusted clock signal SCR which is accurately synchronized with the rotation of the disc 31 is fed from the VCO 203 to the encoder 6. The other construction and operation are the same as the clock signal generator G shown in FIG. 3.

Figure 7:
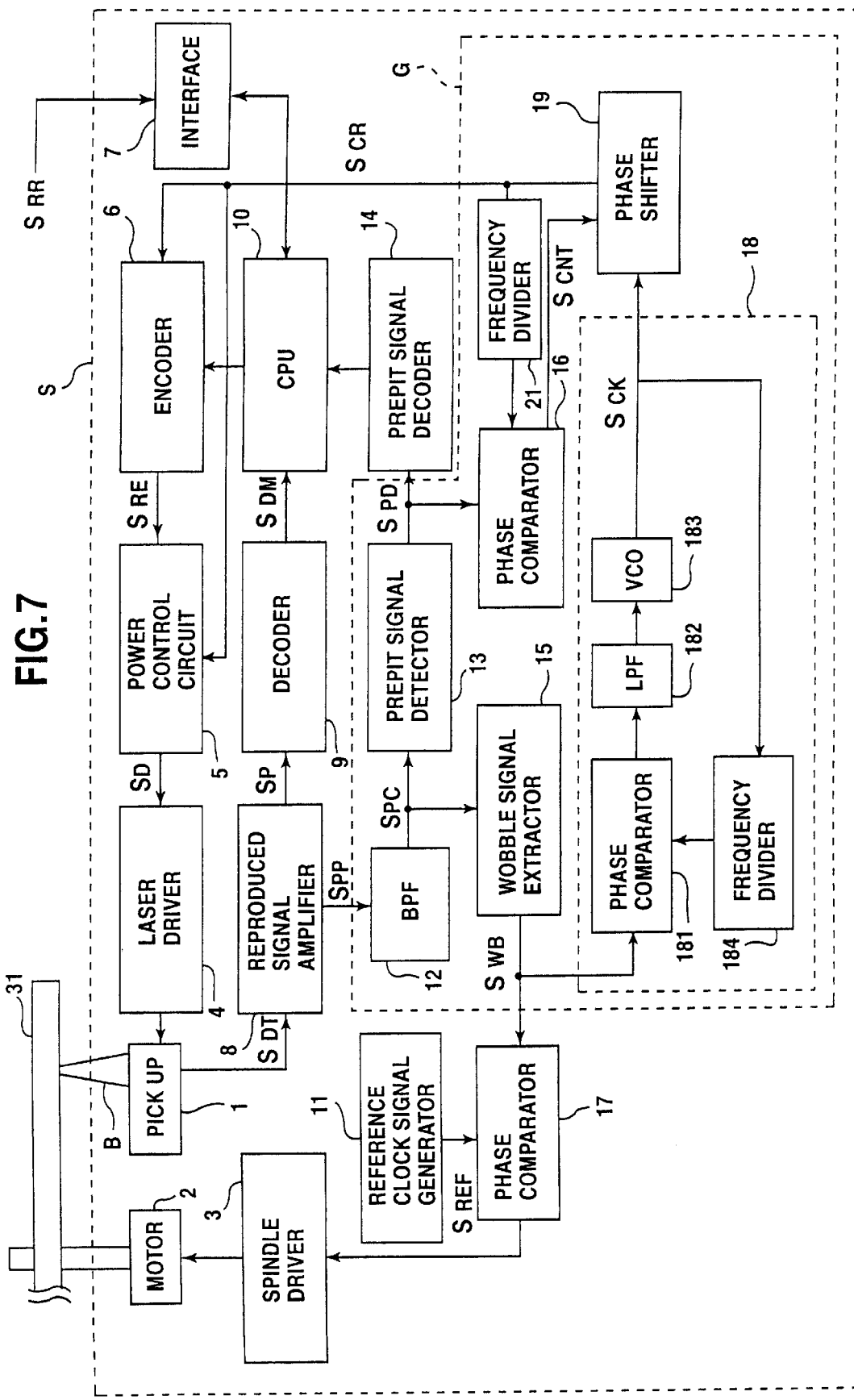

FIG. 7 shows the third embodiment of the present invention wherein the phase comparator 16 is applied with a signal from a frequency divider 21 instead of the extracted wobble signal SWB. Namely, the frequency divider 21 divides the adjusted clock signal SCR. The frequency of the divided signal is the same as that of the extracted wobble signal. The phase comparator 16 compares the phase of the divided signal and the phase of the prepit detection signal SPD, thereby generating the phase difference signal, which is the phase adjusting signal SCNT. The phase adjusting signal SCNT is fed back to the phase shifter 19 to further correct the adjusted clock signal SCR. The other constructions are the same as the clock signal generator shown in FIG. 3 so that the description thereof is omitted.

In the present embodiment, as in the first embodiment, the clock signal is corrected to comply with the detected timing of the prepit based on the difference between the phases of the extracted wobble signal and the prepit detection signal. Hence the accurate adjusted clock signal SCR synchronous with the rotation of the disc can be obtained.

Figure 8:
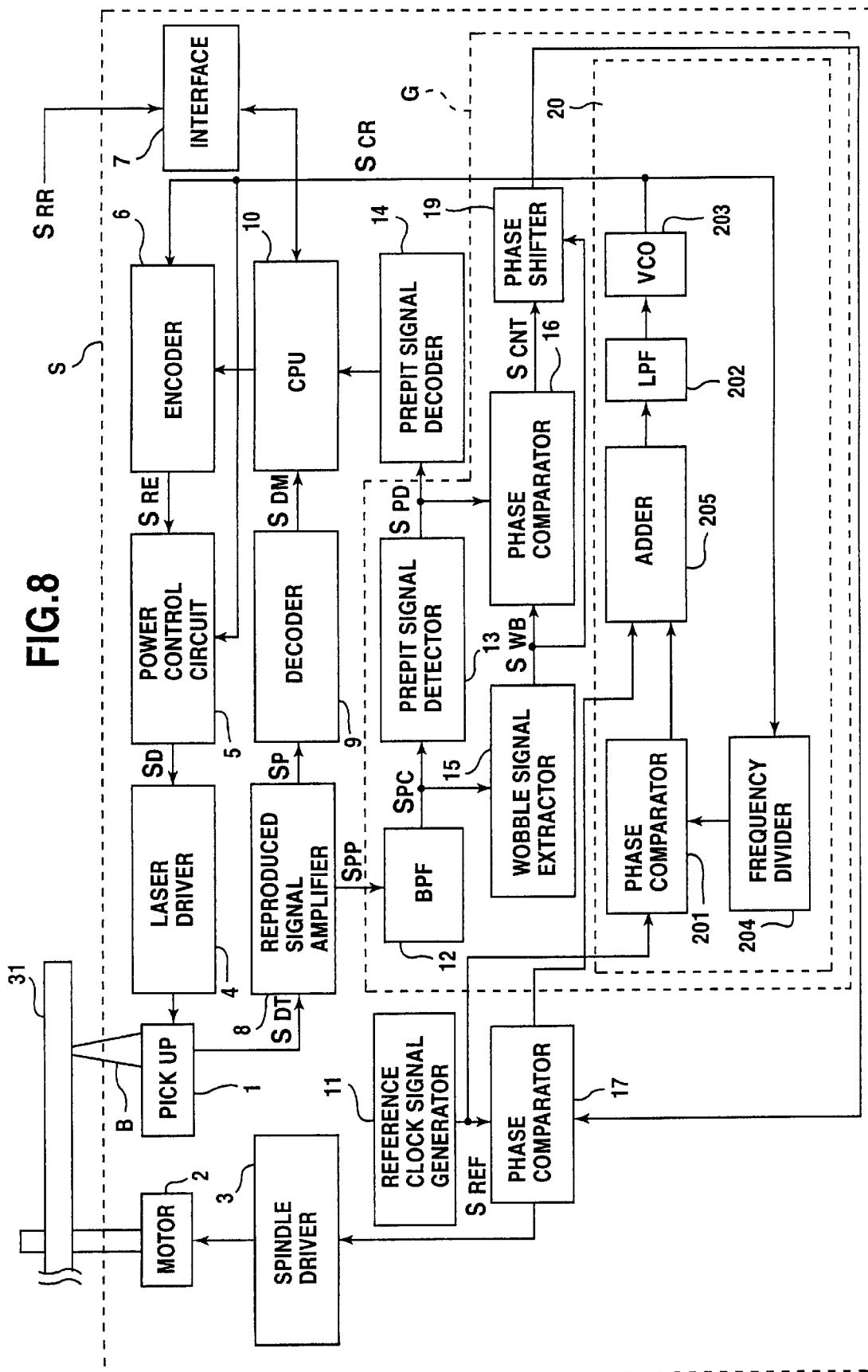

Referring to FIG. 8, the clock signal generator G of the fourth embodiment is provided with the PLL 20 described in the second embodiment. The phase shifter 19 of the present embodiment is applied with the extracted wobble signal SWB from the wobble signal extractor 15 and the phase adjusting signal SCNT from the phase comparator 16. Namely, the phase of the extracted wobble signal SWB is shifted in accordance with the phase adjusting signal SCNT by the phase shifter 19. The shifted wobble signals is fed to the phase comparator 17 to which is applied the reference clock signal SREF from the reference clock generator 11. The phases of the signals are compared to generate a phase difference signal, which is applied to the spindle driver 3 to control the operation of the spindle motor 2 for rotating the disc 31.

The phase difference signal is further fed to the adder 205 of the PLL 20 so as to be added to the phase difference signal from the phase comparator 201. The clock signal SCK is corrected in accordance with the added phase signal from the adder 205 and fed to the encoder 6 and the power control circuit 5.

Namely, in the present embodiment, the extracted wobble signal SWB is directly shifted in the phase shifter 19, and the adjusted clock signal SCR is generated based on the shifted wobble signal. The rotation of the disc 31 is also controlled in accordance with the adjusted clock signal SCR.

Figure 9:
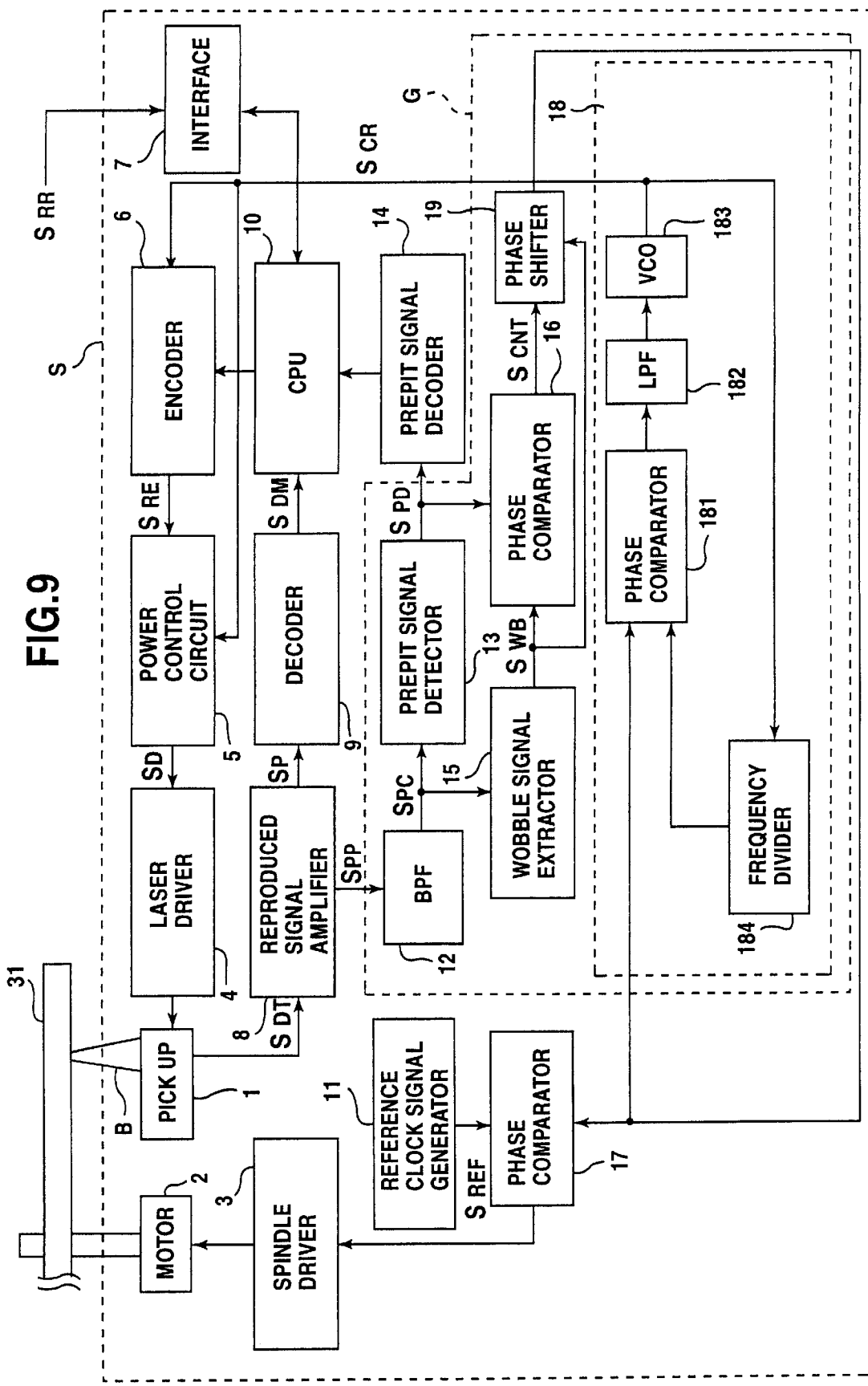

The embodiment of FIG. 8 is further modified to form the clock signal generator G of FIG. 9. The clock signal generator G of the fifth embodiment shown in FIG. 9 has the PLL 18, that is the PLL without the adder, provided in the first embodiment.

The shifted wobble signal is applied to the phase comparator 181 of the PLL 18 so that the clock signal generated by the VCO 183 is adjusted to comply with the phase of the shifted wobble signal. Hence the adjusted clock signal SCR which is accurately synchronous with the rotation of the disc 31 is generated. The present embodiment is advantageous in that the adder can be omitted.

Figure 10:
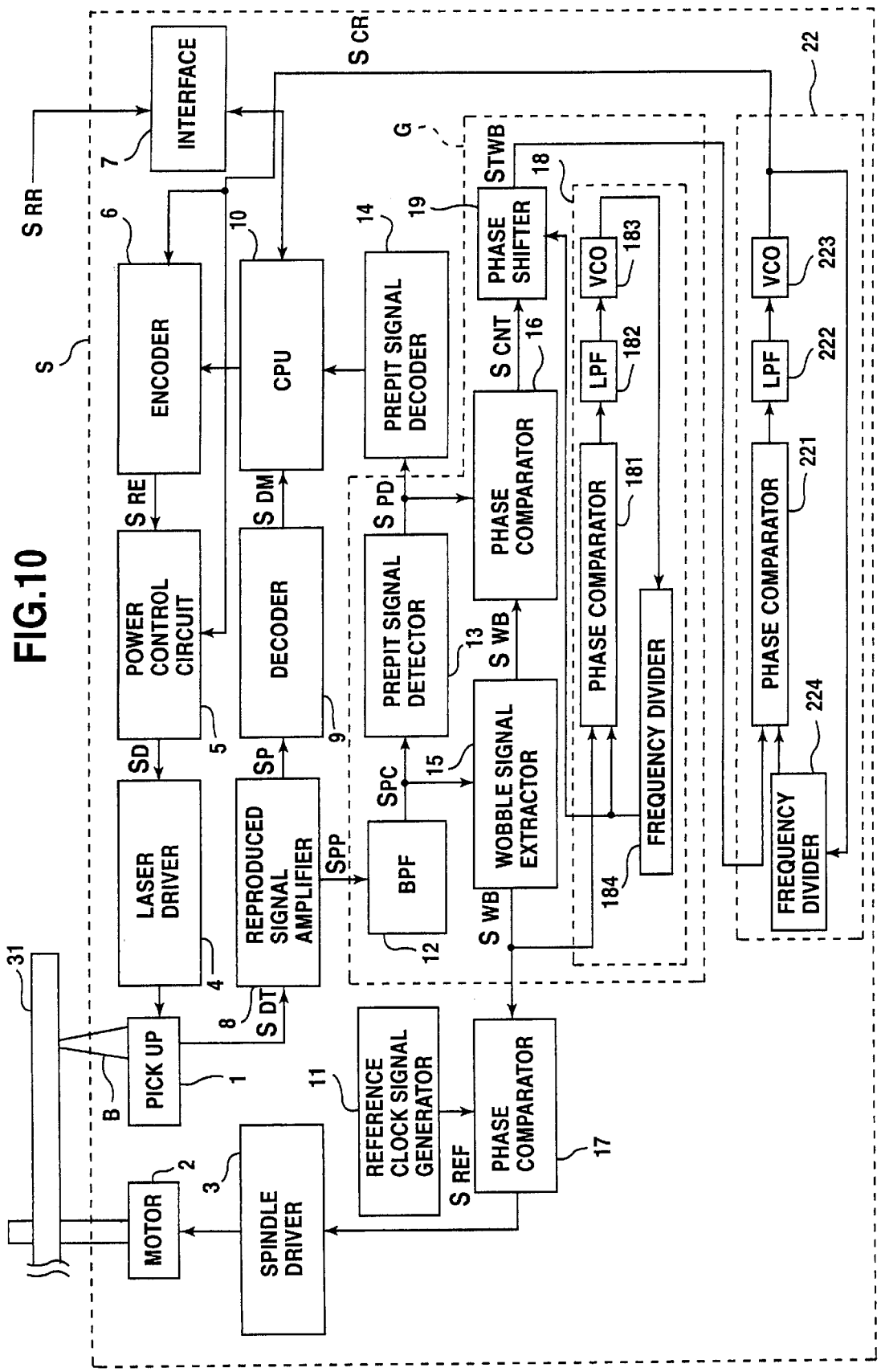

Referring to FIG. 10, the phase shifter 19 of the sixth embodiment of the present invention is applied with the signal generated at the VCO 183 of the PLL 18 and divided at the frequency divider 184 so as to have the same phase as the extracted wobble signal SWB. Accordingly, the phase shifter 19 generates an adjusted wobble signal STWB, the phase of which is shifted in accordance with the phase adjusting signal SCNT, and applies it to a second PLL 22.

The second PLL 22 comprises a VCO 223, frequency divider 224, phase comparator 221, and an LPF 222. The adjusted wobble signal STWB is fed to the phase comparator 221 so that the phase of the clock signal is adjusted, thereby generating the adjusted clock signal SCR.

The clock signal generator G of the sixth embodiment is advantageous in that the shifting quantity of the phase at the phase shifter 19 can be decreased. More particularly, in the phase shifter 19 of the first embodiment, the clock signal SCK having a frequency which is 186 times (1488T/8) as much as the frequency of the extracted wobble signal SWB is shifted in accordance with the phase adjusting signal SNCT which corresponds to a difference between the phases of the extracted wobble signals SWB and the prepit detection signal SPD.

Hence the phase of the clock signal SCK must be shifted more than 360 degrees. For example, although the deflection of the phase of the extracted wobble signal from that of the prepit detection signal SPD is only 2 degrees, that is 1/180 wavelength of the extracted wobble signal, the clock signal must be shifted 1.03 wave, that is, 372 (1.03×360) degrees.

To the contrary, in the present embodiment, the signal from the frequency divider 184 of the PLL 18 having the same cycle as that of. the extracted wobble signal is applied to the phase shifter 19. Thus, when the difference between the phases of the extracted wobble signal and the prepit detection signal SPD is 2 degrees, the phase is shifted 2 degrees at the phase shifter 19.

As described with reference to FIG. 2, the number of the prepits 34 provided for each synchronous frame is three at the maximum and no prepits exist in the remaining latter portion of the frame. Accordingly, when there is a crosstalk from the adjacent tracks, causing jitters in the wobble signal, although the jitters in the wobble signal are compensated based on one of the prepits, the compensation cannot be carried out until the next prepit is detected at the next frame. As a result, when the jitters occur during a period where the prepits are not provided, the phase of the clock signal is deflected from the phase of the rotation of the disc.

Figure 11:
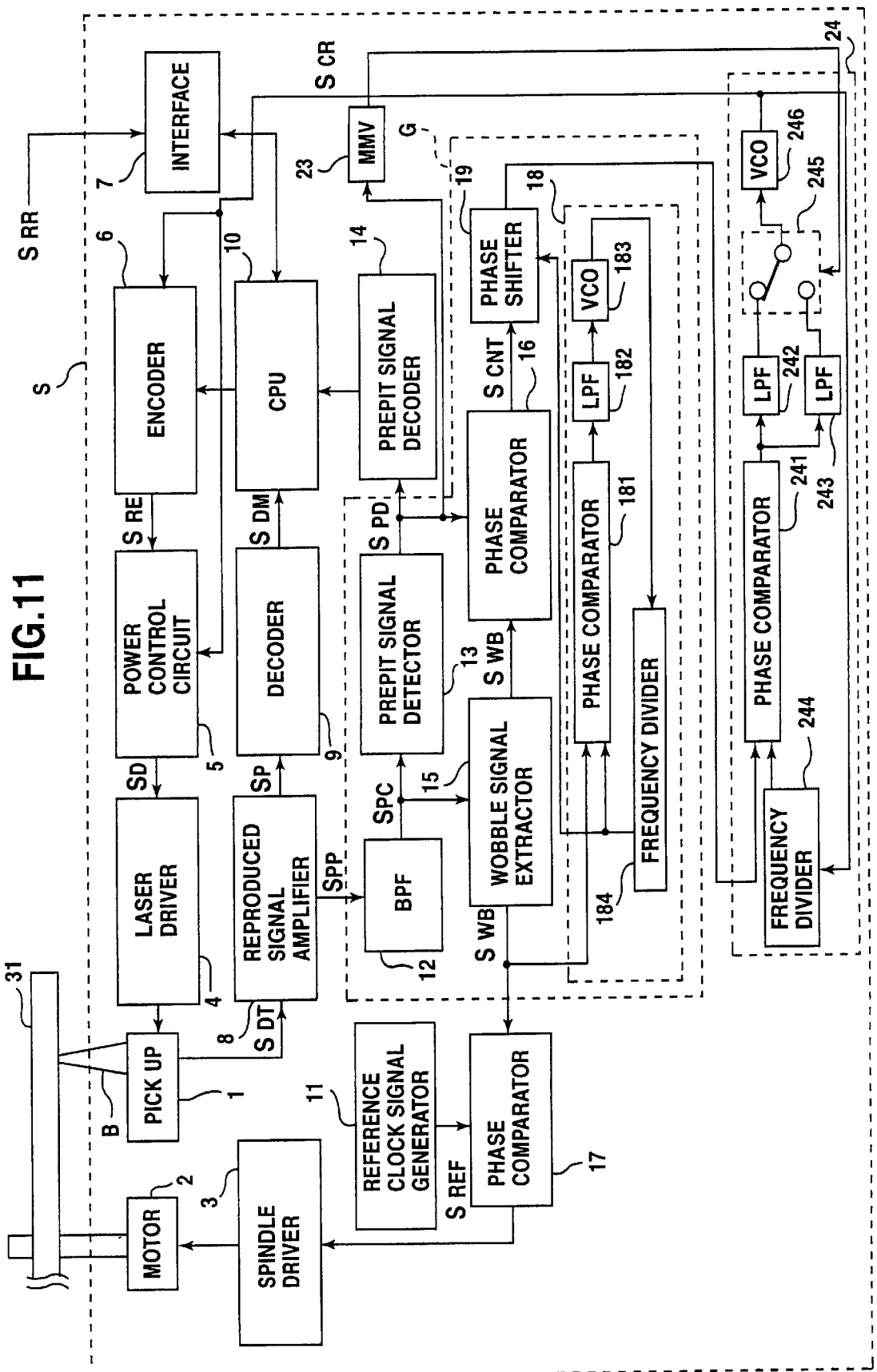

The seventh embodiment shown in FIG. 11 is intended to solve the problem.

Referring to FIG. 11, the clock signal generator G has a monostable multivibrator (MMV) 23 which produces a pulse signal at a predetermined pulse interval in accordance with the prepit detection signal SPD applied from the prepit detector 13. The clock signal generator G is further provided with a second PLL 24 instead of the second PLL 22 in FIG. 10. Similar to the PLL 22, the second PLL 24 has a VCO 246, frequency divider 244, phase comparator 241, and LPFs 242 and 243 which are selectively connected to the VCO 246 through a switch 245. The LPF 242 has a bandwidth which is the same as or larger than the bandwidth of the LPF 222 in FIG. 10, and the LPF 243 has a bandwidth which is smaller than the bandwidth of the LPF 222, thereby allowing to pass frequency components adjacent the direct current component through the LPF 243. The switch 245 is applied with the pulse signal from the MMV 23.

The MMV 23 is a re-triggerable multivibrator wherein, when a pulse of the prepit detection signal SPD is fed while the pulse signal is generated therefrom, the MMV 23 continues to generate the pulse signal. Thus if the interval of the pulse signal is set at a time slightly longer than the cycle of the extracted wobble signal, which is for example, about 7.2 µs, that is 8 µs, for example, the pulse signal is generated by the MMV 23 for the maximum of 22.4 µs (7.2 µs+7.2 µs+8 µs) in one synchronous frame.

When the pulse signal is applied, the switch 245 is operated to connect the LPF 242 with the VCO 246, thereby improving the response of the PLL 24 to comply with the adjusted wobble signal STWB from the phase shifter 19.

When the pulse signal from the MMV 23 is not applied to the switch 245, the VCO 246 is connected to the LFP 243. Hence the response of the PLL 24 is deteriorated. Namely, during that time, since the extracted wobble signal is not corrected in accordance with the prepit, the extracted wobble signal may include phase deflection components in a high frequency range because of the crosstalk. By lowering the response of the PLL 24, the influence of the phase deflection components caused by unfavorable crosstalk can be prevented.

When the prepit is not detected, the direct current component is fed back through the LPF 243 to prepare for the operation of the PLL 24 when the prepit is again detected.

The seventh embodiment may be modified so as to dispose a sample-and-hold circuit controlled by the prepit detection signal downstream the LPF 242 to obtain the same result.

The present invention may be applied to DVD-R discs wherein the prepits are formed in the groove tracks wherein the data are to be recorded.

From the foregoing it will be understood that the present invention provides a clock signal generator wherein the phase of the clock signal is adjusted in accordance with the phase difference signal which is obtained from the difference between the phases of the wobble signal and the prepit detection signal. Namely, in the clock signal generator wherein the wobble signal is used to produce the clock signal, since the wobble signal is liable to be influenced by the crosstalk which cannot be ignored, the deflection of the clock signal with respect to the time axis is corrected in accordance with the prepit detection signal unaffected by the crosstalk. Hence a clock signal which is highly synchronous with the rotation of the disc can be generated.

While the invention has been described in conjunction with preferred specific embodiment thereof, it will be understood that this description is intended to illustrate and not limit the scope of the invention, which is defined by the following claims.

What is claimed is:

1. An information recording apparatus for recording information on a recording medium having a wobbled recording track and a preformed data portion, the apparatus comprising:
    a detector which generates a detection signal obtained from the recording medium;
    a wobble signal extractor which extracts a wobble signal from the detection signal;
    a clock signal generator which generates a recording clock signal on the basis of the extracted wobble signal; and
    a data detector which detects, from the detection signal, a prerecorded data signal corresponding to the preformed data portion,
    wherein the information is recorded on the recording medium on the basis of the recording clock signal and the prerecorded data signal.

2. The apparatus according to claim 1, wherein an optimum power for recording is determined on the basis of the prerecorded data signal.

3. The apparatus according to claim 1, further comprising a controller which determines a recording position on the recording medium on the basis of the prerecorded data signal.

4. An information recording apparatus for recording information on a recording medium having a wobbled recording track and a preformed data portion, wherein the data portion is preformed in a discrete manner, having predetermined phase relation with respect to a wobble period of the wobbled recording track, and is dispersed with respect to a predetermined number of the wobble period of the wobbled recording track, the apparatus comprising:
a detector which generates a detection signal obtained from the recording medium;
a wobble signal extractor which extracts a wobble signal from the detection signal;
a clock signal generator which generates a recording clock signal on the basis of the extracted wobble signal; and
a data detector which detects, from the detection signal, a prerecorded data signal corresponding to the preformed data portion,
wherein the information is recorded on the recording medium on the basis of the recording clock signal and the prerecorded data signal.

5. The apparatus according to claim 4, wherein an optimum power for recording is determined on the basis of the prerecorded data signal.

6. The apparatus according to claim 5, further comprising a controller which determines a recording position on the recording medium on the basis of the prerecorded data signal.

7. An information recording apparatus for recording information on a recording medium having a wobbled recording track and a preformed data portion, the apparatus comprising:
a detector which generates a detection signal obtained from the recording medium;
a wobble signal extractor which extracts a wobble signal from the detection signal;
a data detector which detects, from the detection signal, a prerecorded data signal corresponding to the preformed data portion; and
a clock signal generator which generates a recording clock signal on the basis of the extracted wobble signal and the prerecorded data signal,
wherein the information is recorded on the recording medium on the basis of the recording clock signal and the prerecorded data signal.

8. The apparatus according to claim 7, wherein the data portion is preformed in a discrete manner, having predetermined phase relationship with a wobble period of the wobbled recording track, and is dispersed with respect to a predetermined number of the wobble period of the wobbled recording track.

9. The apparatus according to claim 7, wherein the clock signal generator includes a phase adjusting circuit which adjusts a phase of the wobble signal in accordance with the prerecorded data signal.

10. The apparatus according to claim 7, wherein the clock signal generator includes:
a PLL circuit which generates a first clock signal in synchronization with the wobble signal;
a first phase comparator which compares a phase of the first clock signal and a phase of the prerecorded data signal, and generates a phase adjusting signal; and
a phase shifter which adjusts a phase of the first clock signal in accordance with the phase adjusting signal.

11. The apparatus according to claim 7, further comprising:
a reference clock generator which generates a reference clock signal;
a second phase comparator which compares a phase of the recording clock signal and a phase of the reference clock signal, and generates a differential signal; and
a spindle servo circuit which controls a rotational speed of the recording medium in accordance with the differential signal.

* * * * *